(12) United States Patent
Fortune

(10) Patent No.: US 6,826,119 B2
(45) Date of Patent: Nov. 30, 2004

(54) SYSTEM FOR SIGNALING THAT A PRODUCT EXPIRATION DATE HAS PASSED

(76) Inventor: Sherena D. Fortune, 13599 Meyers, Detroit, MI (US) 48227

( * ) Notice: Subject to any disclaimer, the term of this patent is extended or adjusted under 35 U.S.C. 154(b) by 471 days.

(21) Appl. No.: 09/751,737

(22) Filed: Dec. 29, 2000

(65) Prior Publication Data

US 2002/0085453 A1 Jul. 4, 2002

(51) Int. Cl.[7] .................. G01K 1/02; G04C 19/00
(52) U.S. Cl. .................. 368/10; 368/327; 368/243; 116/200; 235/462.01
(58) Field of Search ............... 368/243, 10; 116/206; 235/462.01, 462.02, 494; 705/22–28

(56) References Cited

U.S. PATENT DOCUMENTS

| | | | |
|---|---|---|---|
| 5,196,686 A | * 3/1993 | Leister | ............ 235/462 |
| 5,243,579 A | 9/1993 | Potthof | |
| D347,024 S | 5/1994 | Rabus | |
| 5,442,669 A | 8/1995 | Medin | |
| 5,487,276 A | 1/1996 | Namisniak et al. | |
| 5,555,223 A | 9/1996 | Barainsky | |
| 5,802,015 A | 9/1998 | Rothschild et al. | |
| 6,009,400 A | * 12/1999 | Blackman | ............ 235/462 |
| 6,131,399 A | * 10/2000 | Hall | ............ 705/28 |
| 6,190,610 B1 | * 2/2001 | Goldsmith et al. | ............ 116/206 |
| 6,327,576 B1 | * 12/2001 | Ogasawara | ............ 705/22 |
| 6,550,685 B1 | * 4/2003 | Kindberg | ............ 235/494 |

* cited by examiner

Primary Examiner—David Martin
Assistant Examiner—Jeanne-Marguerite Goodwin

(57) ABSTRACT

System for signaling that a product expiration date has passed. The bar code indicia system for signaling that a product has expired includes a bar code indicia, a detecting means of detecting the bar code indicia and a signaling means for signaling to a consumer that the product has passed a date of detection.

13 Claims, 1 Drawing Sheet

SYSTEM FOR SIGNALING THAT A PRODUCT EXPIRATION DATE HAS PASSED

BACKGROUND OF THE INVENTION

1. Field of the Invention

The present invention relates to date recognition systems and more particularly pertains to a new bar code indicia system for signaling that a product has expired.

2. Description of the Prior Art

The use of date recognition systems is known in the prior art. More specifically, date recognition systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,802,015; U.S. Pat. No. 5,243,579; U.S. Pat. No. 5,487,276; U.S. Pat. No. 5,555,223; U.S. Pat. No. 5,442,669; and U.S. Pat. No. Des. 347,024.

While these devices fulfill their respective, particular objectives and requirements, the aforementioned patents do not disclose a new system for signaling that a product expiration date has passed. The inventive device includes a bar code indicia, a detecting means of detecting the bar code indicia, and a signaling means for signaling to a consumer that the product has passed a date of detection.

In these respects, the system for signaling that a product expiration date has passed according to the present invention substantially departs from the conventional concepts and designs of the prior art, and in so doing provides an apparatus primarily developed for the purpose of signaling that the expiration date on a product has passed.

SUMMARY OF THE INVENTION

In view of the foregoing disadvantages inherent in the known types of date recognition systems now present in the prior art, the present invention provides a new system for signaling that a product expiration date has passed wherein the same can be utilized for signaling that the expiration date on a product has passed.

The general purpose of the present invention, which will be described subsequently in greater detail, is to provide a new system for signaling that a product expiration date has passed apparatus and method which has many of the advantages of the date recognition systems mentioned heretofore and many novel features that result in a new system for signaling that a product expiration date has passed which is not anticipated, rendered obvious, suggested, or even implied by any of the prior art date recognition systems, either alone or in any combination thereof.

To attain this, the present invention generally comprises a bar code indicia, a detecting means of detecting the bar code indicia, and a signaling means for signaling to a consumer that the product has passed a date of detection.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bar code indicia system for signaling that a product has expired apparatus and method which has many of the advantages of the date recognition systems mentioned heretofore and many novel features that result in a new system for signaling that a product expiration date has passed which is not anticipated, rendered obvious, suggested, or even implied by any of the prior art date recognition systems, either alone or in any combination thereof.

It is another object of the present invention to provide a new bar code indicia system for signaling that a product has expired which may be easily and efficiently manufactured and marketed.

It is a further object of the present invention to provide a new system for signaling that a product expiration date has passed which is of a durable and reliable construction.

An even further object of the present invention is to provide a new bar code indicia system for signaling that a product has expired which is susceptible of a low cost of manufacture with regard to both materials and labor, and which accordingly is then susceptible of low prices of sale to the consuming public, thereby making such system for signaling that a product expiration date has passed economically available to the buying public.

Still yet another object of the present invention is to provide a new bar code indicia system for signaling that a product has expired which provides in the apparatuses and methods of the prior art some of the advantages thereof, while simultaneously overcoming some of the disadvantages normally associated therewith.

Still another object of the present invention is to provide a new bar code indicia system for signaling that a product has expired.

Yet another object of the present invention is to provide a new bar code indicia system for signaling that a product has expired which includes a bar code indicia, a detecting means of detecting the bar code indicia, and a signaling means for signaling to a consumer that the product has passed a date of detection.

Still yet another object of the present invention is to provide a new bar code indicia system for signaling that a product has expired that reduces the chances of a person taking expired food home and consuming it and becoming ill.

Even still another object of the present invention is to provide a new bar code indicia system for signaling that a product has expired that saves the purchaser time by eliminating the need to return to the seller of the product for an exchange or refund.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
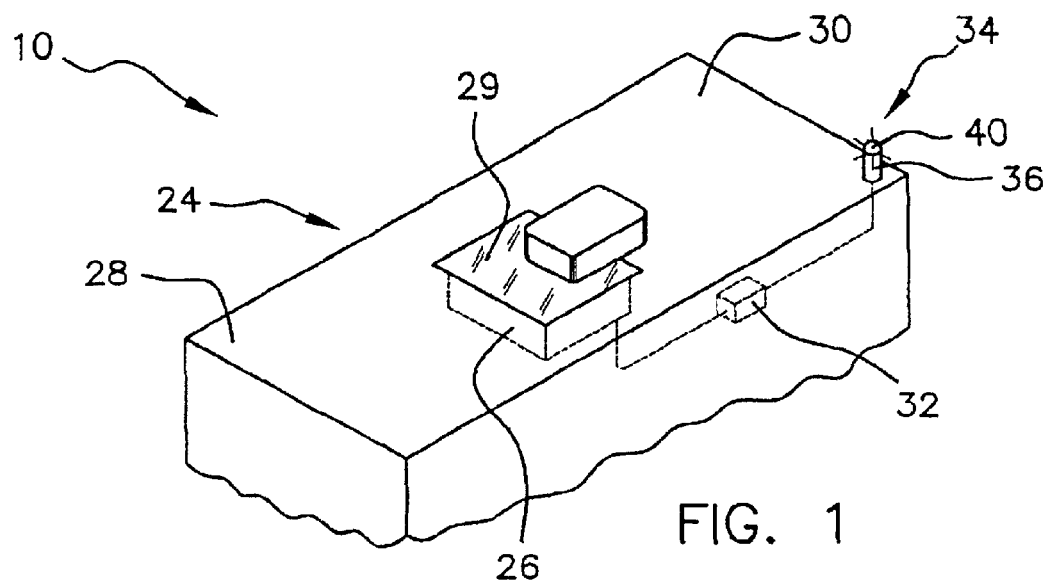
FIG. 1 is a schematic perspective view of a new system for signaling that a product expiration date has passed according to the present invention.
Figure 2:
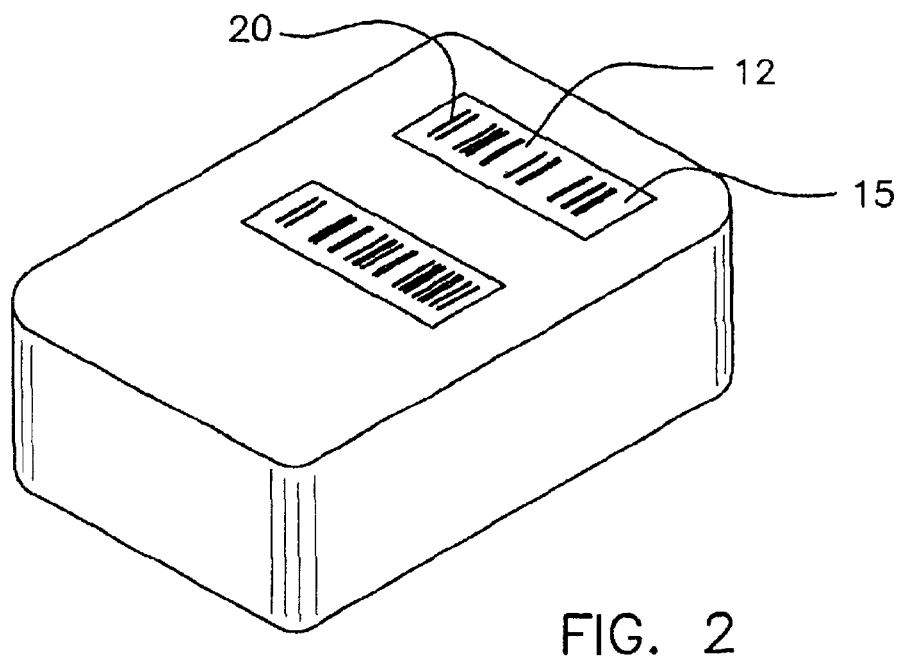
FIG. 2 is a schematic perspective view of the present invention showing the bar code indicia placed on a product.
Figure 3:
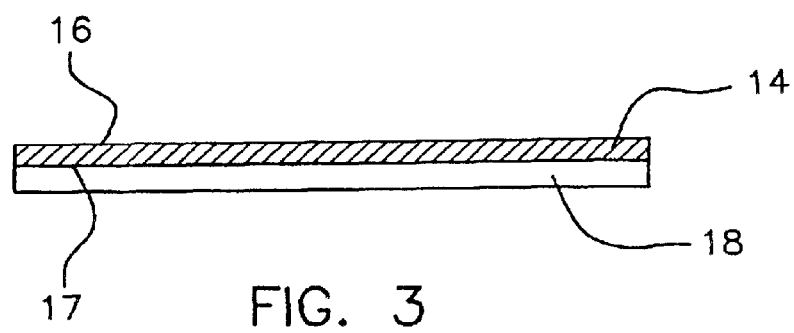
FIG. 3 is a schematic cross-sectional view of the present invention showing the bar code indicia having an adhesive on a back surface of a substrate.

With reference now to the drawings, and in particular to FIGS. 1 through 3 thereof, a new system for signaling that a product expiration date has passed embodying the principles and concepts of the present invention and generally designated by the reference numeral 10 will be described.

As best illustrated in FIGS. 1 through 3, the system for signaling that a product has expired 10 generally comprises bar code indicia 12 as illustrated in FIG. 2. The bar code indicium 12 is marked on a substrate 14 such as directly marked on a product, or on the packaging of the product. In one embodiment, the substrate 14 comprises a label 15 having a top surface 16 and a bottom surface 17 with an adhesive 18 applied thereon for attachment to the product. The substrate 14 may comprise any material such as paper, plastic or metal that is adaptable to having bar code indicia 12 marked thereon.

The bar code indicia 12 includes a plurality of bars 20 marked on the top surface 15 of the substrate 14. Each of the bars 20 is arranged on the substrate 14 in a manner indicating a particular expiration date of the product, for example by the spacing and/or relative thickness of the bars 20. Each of the bars 20 is orientated parallel to each other. However, it is also believed that the bars 20 may be orientated in a plurality of arrangements that may indicate the expiration date of a product.

As seen in FIG. 2, there is a detecting means 24 for detecting the bar code indicia 12. The detecting means 24 comprises a scanner 26 that is designed for scanning bar code indicia 12. The scanner 26 may be a conventional scanner using a laser beam that scans the bar code indicia 12 and correlates the indicia to a number representing an expiration date. The scanner 26 is mounted in a counter 28 that includes a scanner window 29. The scanner window 29 is usually mounted in an upper surface 30 of the counter 28 allowing a clerk to pass the product having the bar code indicia over the scanner window 29 where the scanner 26 can read the bar code indicia 12. The scanner 26 may also be mounted above the counter 28 or as a hand held unit that is pointed at the bar code indicia 12 for reading.

A processor 32 is coupled to the scanner 26. The processor 32 is provided for comparing the current date when the bar code indicia 12 is scanned to the expiration date of the product represented by the bar code indicia 20. If the expiration date of the product is earlier than the current date, the processor causing a signaling means 34 to signal a buyer that the expiration date on the product has passed.

The signaling means 34 for signaling when the expiration date of the product has passed is coupled to the processor 32. The signaling means 34 may comprise a cylindrical housing 36 that is mounted to the counter 28. The cylindrical housing 36 is generally mounted on the counter 28 in a place that is highly visible to the buyer. A light 40 is mounted in a translucent cylindrical housing 36. A light having a propensity for attracting the buyer's attention may be used.

In use, the light 40 illuminates when the bar code indicia 12 adhered to the product passed over the scanner 26 indicates that the date of expiration has passed, informing the potential buyer of the expiration of the product. This allows the buyer to decide whether or not to purchase the product.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bar code indicia system for signaling when an expiration date of a product has passed, said bar code indicia system comprising:

a bar code indicia indicating the expiration date of the product such that said bar code indicia is readable after the expiration date of the product, said bar code indicia being marked on the product;

a detecting means for scanning said bar code indicia such that detecting means is for detecting the expiration date of said bar code indicia;

a signaling means being operationally coupled to said detecting means, said signaling means being for signaling to a potential buyer that the expiration date of the product occurred before a date of detection of said bar code indicia; and said signaling means comprising a translucent cylindrical housing and a light, said cylindrical housing being mounted on a counter such that said cylindrical housing extends upwardly from said counter, said light being illuminatable upon actuating by said detecting means, said light being removably mounted in said housing opposite said counter such that said light is adapted for being readily seen by the potential buyer positioned anywhere along the length of said counter when said light is illuminated by said detecting means.

2. The bar code indicia system of claim 1, wherein said bar code indicia comprises a plurality of bars being marked on the product, each of said bars being arranged in a manner indicating a particular expiration date of the product.

3. The bar code indicia system of claim 2, wherein each of said bars is orientated substantially parallel to each other.

4. The bar code indicia system of claim 2, further comprising:
a substrate having a top surface, each of said bars being marked on said top surface of said substrate.

5. The bar code indicia system of claim 4, wherein said substrate has a bottom surface with an adhesive thereon for attachment to the product.

6. The bar code indicia system of claim 1, wherein detecting means comprises:
a scanner being adapted for scanning bar code indicia;
a processor being connected to said scanner; and
wherein said signaling means is coupled to said processor.

7. The bar code indicia system of claim 6, wherein said processor is adapted to compare the date of detection of the bar code indicia to the expiration date of the product represented by the bar code indicia and to cause said signaling means to signal to the buyer when that the expiration date is before the date of detection.

8. The bar code indicia system of claim 6, wherein said scanner is mounted in a counter having a scanner window, said scanner being positioned under said scanner window.

9. A bar code indicia system for signaling when an expiration date of a product has passed, said bar code indicia system comprising:
a detecting means for scanning a bar code indicia, said bar code indicia being readable after the expiration date of the product;
a signaling means being operationally coupled to said detecting means, said signaling means being for signaling to a potential buyer that the expiration date of the product occurred before a date of detection of said bar code indicia; and
said signaling means comprising a translucent cylindrical housing and a light, said cylindrical housing being mounted on a counter such that said cylindrical housing extends upwardly from said counter, said light being illuminatable upon actuating by said detecting means, said light being removably mounted in said housing opposite said counter such that said light is adapted for being readily seen by the potential buyer positioned anywhere along the length of said counter when said light is illuminated by said detecting means.

10. The bar code indicia system of claim 9, wherein said detecting means comprises:
a scanner being adapted for scanning bar code indicia;
a processor being connected to said scanner; and
wherein said signaling means is connected to said processor.

11. The bar code indicia system of claim 10, wherein said processor is adapted to compare a date of detection of the bar code indicia to the expiration date of the product represented by the bar code indicia and to cause said signaling means to signal to the buyer when the expiration date is before the date of detection.

12. The bar code indicia system of claim 10, wherein said scanner is mounted in said counter having a scanner window, said scanner being positioned under said scanner window.

13. System for signaling that a product expiration date has passed, said bar code indicia system comprising:
a bar code indicia being readable after the expiration date of the product, said bar code indicia comprising;
a substrate, said substrate having a top surface, wherein said substrate comprises a label having a bottom surface with an adhesive applied thereon for attachment to the product;
a plurality of bars being marked on said top surface of said substrate, each of said bars being arranged on said substrate in a manner indicating a particular expiration date of the product, each of said bars being orientated parallel to each other;
a detecting means for detecting said bar code indicia, said detecting means comprising;
a scanner being adapted for scanning bar code indicia, said scanner being mounted under a counter having an upper surface for holding the products to be scanned; and
a processor being coupled to said scanner, said processor being adapted for comparing the current date to the expiration date of the product and signaling to the consumer that the expiration date on the product has passed;
a signaling means for signaling when the expiration date of the product has passed, said signaling means being coupled to said processor, said signaling means comprising a translucent cylindrical housing and a light, said cylindrical housing being mounted on a counter such that said cylindrical housing extends upwardly from said counter, said light being illuminatable upon actuating by said detecting means, said light being removably mounted in said housing opposite said counter such that said light is adapted for being readily seen by the potential buyer positioned anywhere along the length of said counter when said light is illuminated by said detecting means.

* * * * *